United States Patent
Miyata (10) Patent No.: US 8,031,353 B2
(45) Date of Patent: Oct. 4, 2011

(54) DATA PROCESSING DEVICE FOR RENAMING VIRTUAL DEVICE

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1133 days.

(21) Appl. No.: 11/627,006

(22) Filed: Jan. 25, 2007

(65) Prior Publication Data

US 2007/0177178 A1    Aug. 2, 2007

(30) Foreign Application Priority Data

Jan. 30, 2006 (JP) ................. 2006-021203

(51) Int. Cl.
*G06F 15/00* (2006.01)
*G06F 3/048* (2006.01)
(52) U.S. Cl. ...................... 358/1.15; 715/847
(58) Field of Classification Search .......... 358/1.15, 358/1.13, 1.14, 1.16, 1.18; 715/847, 109, 715/736, 763, 835; 706/20; 709/217, 219; 719/321, 322, 323, 325
See application file for complete search history.

(56) References Cited

U.S. PATENT DOCUMENTS

| | | | |
|---|---|---|---|
| 5,353,399 A | 10/1994 | Kuwamoto et al. | |
| 5,845,078 A | 12/1998 | Tezuka et al. | |
| 5,996,029 A | 11/1999 | Sugiyama et al. | |
| 6,177,934 B1 | 1/2001 | Sugiura | |
| 6,184,998 B1 | 2/2001 | Tebeka | |
| 6,473,811 B1 | 10/2002 | Onsen | |
| 6,798,530 B1 * | 9/2004 | Buckley et al. | 358/1.13 |
| 7,231,435 B2 | 6/2007 | Ohta | |
| 7,287,253 B2 | 10/2007 | Yamamura et al. | |
| 7,310,690 B2 | 12/2007 | Yokota | |
| 7,779,168 B2 | 8/2010 | Yamamura et al. | |
| 2003/0066027 A1 | 4/2003 | Nakagiri | |
| 2004/0051743 A1 | 3/2004 | Gonsho | |
| 2004/0227973 A1 | 11/2004 | Taylor | |
| 2004/0230966 A1 * | 11/2004 | Morris et al. | 717/169 |
| 2005/0206938 A1 | 9/2005 | Oono | |
| 2006/0200644 A1 | 9/2006 | Asada et al. | |

(Continued)

FOREIGN PATENT DOCUMENTS

JP       7152507       6/1995

(Continued)

OTHER PUBLICATIONS

Office Action received in corresponding JP Application No. 2006-021203, mailed Mar. 16, 2010.

(Continued)

*Primary Examiner* — Saeid Ebrahimi Dehkordy
(74) *Attorney, Agent, or Firm* — Banner & Witcoff, Ltd.

(57) ABSTRACT

A data processing device includes a registering unit, a display unit, a settings-acquiring unit, and a virtual device renaming unit. The registering unit registers a plurality of communicable printers as a plurality of virtual devices. Each of the plurality of virtual devices has a plurality of functions. The display unit displays a plurality of virtual device names for the plurality of virtual devices. The settings-acquiring unit acquires a setting for at least one of the plurality of functions for each of the plurality of virtual device. The virtual device renaming unit changes at least one of the virtual device names for the plurality of the virtual devices to a device name representing the setting of a corresponding virtual device acquired by the settings-acquiring unit.

20 Claims, 7 Drawing Sheets

U.S. PATENT DOCUMENTS

| | | |
|---|---|---|
| 2006/0206903 A1 | 9/2006 | Lawrence et al. |
| 2007/0177198 A1 | 8/2007 | Miyata |
| 2007/0177202 A1 | 8/2007 | Miyata |

FOREIGN PATENT DOCUMENTS

| | | |
|---|---|---|
| JP | 9-006557 | 1/1997 |
| JP | 9-006558 | 1/1997 |
| JP | 2000076032 | 3/2000 |
| JP | 2000-293336 | 10/2000 |
| JP | 2001-056756 | 2/2001 |
| JP | 2001-282661 | 10/2001 |
| JP | 2001-306279 | 11/2001 |
| JP | 2003271286 | 9/2003 |
| JP | 2003271289 | 9/2003 |
| JP | 2004110127 | 4/2004 |
| JP | 2005-085132 | 3/2005 |
| JP | 2005-267544 | 9/2005 |
| JP | 2006-011831 | 1/2006 |
| JP | 2007-200253 | 8/2007 |
| JP | 2007-200254 | 8/2007 |

OTHER PUBLICATIONS

Extended European Search Report dated Mar. 4, 2008 in Application No. 072502971.

Decision of Rejection mailed Oct. 19, 2010 in Japanese Application No. 2006-021202 and English Translation thereof.

Japanese Office Action dated Mar. 23, 2010 in Japanese Application No. 2006-021202 and English Translation thereof.

European Search Report dated Feb. 19, 2008 in European Application No. 07250309.7.

* cited by examiner

FIG.3

| No. | ORIGINAL VIRTUAL DEVICE NAME | COLOR PRINTING | COLOR SETTING | DUPLEX PRINT SETTING |
|---|---|---|---|---|
| 1 | XXXX1500 Printer | NOT AVAILABLE | OFF | ONE-SIDED |
| 2 | YYYY4800CX | AVAILABLE | ON | AUTOMATIC DUPLEX |
| 3 | ZZZZ 190SF | AVAILABLE | OFF | ONE-SIDED |
| 4 | XXXX1500 Printer (copy 2) | NOT AVAILABLE | OFF | MANUAL DUPLEX |
| 5 | YYYY4900CX | AVAILABLE | ON | ONE-SIDED |

FIG.4

| No. | ORIGINAL VIRTUAL DEVICE NAME | MODIFIED VIRTUAL DEVICE NAME |
|---|---|---|
| 1 | XXXX1500 Printer | 223 MNS   XXXX1500 Printer |
| 2 | YYYY4800CX | 111 CSA   YYYY4800CX |
| 3 | ZZZZ 190SF | 213 MSS   ZZZZ 190SF |
| 4 | XXXX1500 Printer (copy 2) | 222 MNM   XXXX1500 Printer (copy 2) |
| 5 | YYYY4900CX | 113 CSS   YYYY4900CX |

| No. | SETTING CATEGORY | FUNCTION SYMBOL |
|---|---|---|
| 1 | COLOR SETTING | C: COLOR PRINTING<br>M: MONOCHROME PRINTING |
| 2 | COLOR PRINT FUNCTION | S: AVAILABLE    N: NOT AVAILABLE |
| 3 | DUPLEX PRINT SETTING | S: ONE-SIDED PRINTING<br>M: MANUAL DUPLEX PRINTING<br>A: AUTOMATIC DUPLEX PRINTING |

FIG.9

| No. | SETTING CATEGORY | PRIORITY |
|---|---|---|
| 1 | COLOR SETTING | 1: COLOR PRINTING<br>2: MONOCHROME PRINTING |
| 2 | COLOR PRINT FUNCTION | 1: AVAILABLE<br>2: NOT AVAILABLE |
| 3 | DUPLEX PRINT SETTING | 1: AUTOMATIC DUPLEX PRINTING<br>2: MANUAL DUPLEX PRINTING<br>3: ONE-SIDED PRINTING |

DATA PROCESSING DEVICE FOR RENAMING VIRTUAL DEVICE

CROSS REFERENCE TO RELATED APPLICATIONS

This application claims priority from Japanese Patent Application No. 2006-21203 filed Jan. 30, 2006. The entire content of priority application is incorporated herein by reference.

TECHNICAL FIELD

The present invention relates to a data processing device for renaming virtual device and a computer readable medium containing a virtual device renaming program that enables the user to select one of a plurality of virtual devices registered in the data processing device more easily.

BACKGROUND

In recent years, personal computers and other data processing devices have been used in an environment allowing access to a plurality of printers. For example, a system that has a plurality of data processing devices connected to a plurality of printers via a network may be set up so that each of the plurality of data processing devices can access each of the printers. With this system, virtual devices corresponding to the printers are registered in the data processing device so that the user can specify which of the printers is the output destination.

Further, a plurality of virtual devices may be registered in a data processing device, even when the data processing device uses only a single printer as the output destination. For example, when a plurality of different print settings is used frequently, it is possible to register a plurality of virtual devices for a single printer such that each virtual device has different default settings. If the user wishes to use a variety of print settings for a single printer in this way, the user can perform printing with the desired print settings simply by selecting one of the plurality of virtual devices having the desired print settings as the default settings. Therefore, the user need not modify the printer settings for each print operation regarding whether to use the duplex print function, whether to use the color print function, and which of a plurality of paper cassettes to use, thereby eliminating the troublesome operations involved in modifying print settings.

However, if the number of virtual devices registered in a single data processing device becomes excessive under these circumstances, the user must search for a virtual device having a desired function from among the plurality of virtual devices when the user wishes to use the virtual device having the desired function. This can require the user to spend more time looking for the desired virtual device. Further, in order to determine whether the selected virtual device has the desired function, the user must confirm that the function is available after selecting the virtual device. Should the selected virtual device not possess the desired function, the user must select another virtual device and try again. In some cases the user may have to repeat the troublesome operations of selection several times.

To resolve this problem, technologies such as that disclosed in Japanese Patent Application Publication No. H07-152507 have been proposed for generating a plurality of functional device names by combining a printer name with a plurality of function names representing functions possessed by the printer and for displaying the generated functional device names. With this technology, the user can determine what functions the printer possesses simply by browsing through the displayed functional device names.

SUMMARY

However, when using the technology disclosed in Japanese Patent Application Publication No. H07-152507, a plurality of functional device names formed by combining function names is displayed in place of the single device name that is normally displayed. Hence, when a plurality of virtual devices are registered in the data processing device and functional device names are generated by combining the functions possessed in each of the virtual devices, this technology will produce an enormous number of functional device names that, when displayed, actually make the selection operation more difficult.

In view of the foregoing, it is an object of the present invention to provide a data processing device for renaming virtual device and a computer readable medium containing a virtual device renaming program that aids a user in selecting a virtual device having a desired function when a plurality of virtual devices have been registered in a data processing device.

To achieve the above and other objects, one aspect of the invention provides a data processing device including a registering unit, a display unit, a settings-acquiring unit, and a virtual device renaming unit. The registering unit registers a plurality of communicable printers as a plurality of virtual devices. Each of the plurality of virtual devices has a plurality of functions. The display unit displays a plurality of virtual device names for the plurality of virtual devices. The settings-acquiring unit acquires a setting for at least one of the plurality of functions for each of the plurality of virtual device. The virtual device renaming unit changes at least one of the virtual device names for the plurality of the virtual devices to a device name representing the setting of a corresponding virtual device acquired by the settings-acquiring unit.

In another aspect of the invention, there is provided a computer readable medium containing a virtual device renaming program for instructing a data processing device capable of registering a plurality of communicable printers as a plurality of virtual devices, each of the plurality of virtual devices having a plurality of functions, displaying a plurality of device names for the plurality of virtual devices, prompting a user to select one of the plurality of virtual devices, and transmitting print data to a printer corresponding to a selected virtual device. The virtual device renaming program includes a program for acquiring a setting for at least one of the plurality of functions for each of the plurality of virtual device, and a program for renaming at least one of the virtual device names for the plurality of the virtual devices to a device name representing the setting of a corresponding virtual device acquired in the acquiring program.

DESCRIPTION OF THE PREFERRED EMBODIMENTS

Next, a data processing device for renaming virtual device and a computer readable medium containing a virtual device renaming program according to a preferred embodiment of the present invention will be described.

[Overall Structure of the System]

Figure 1:
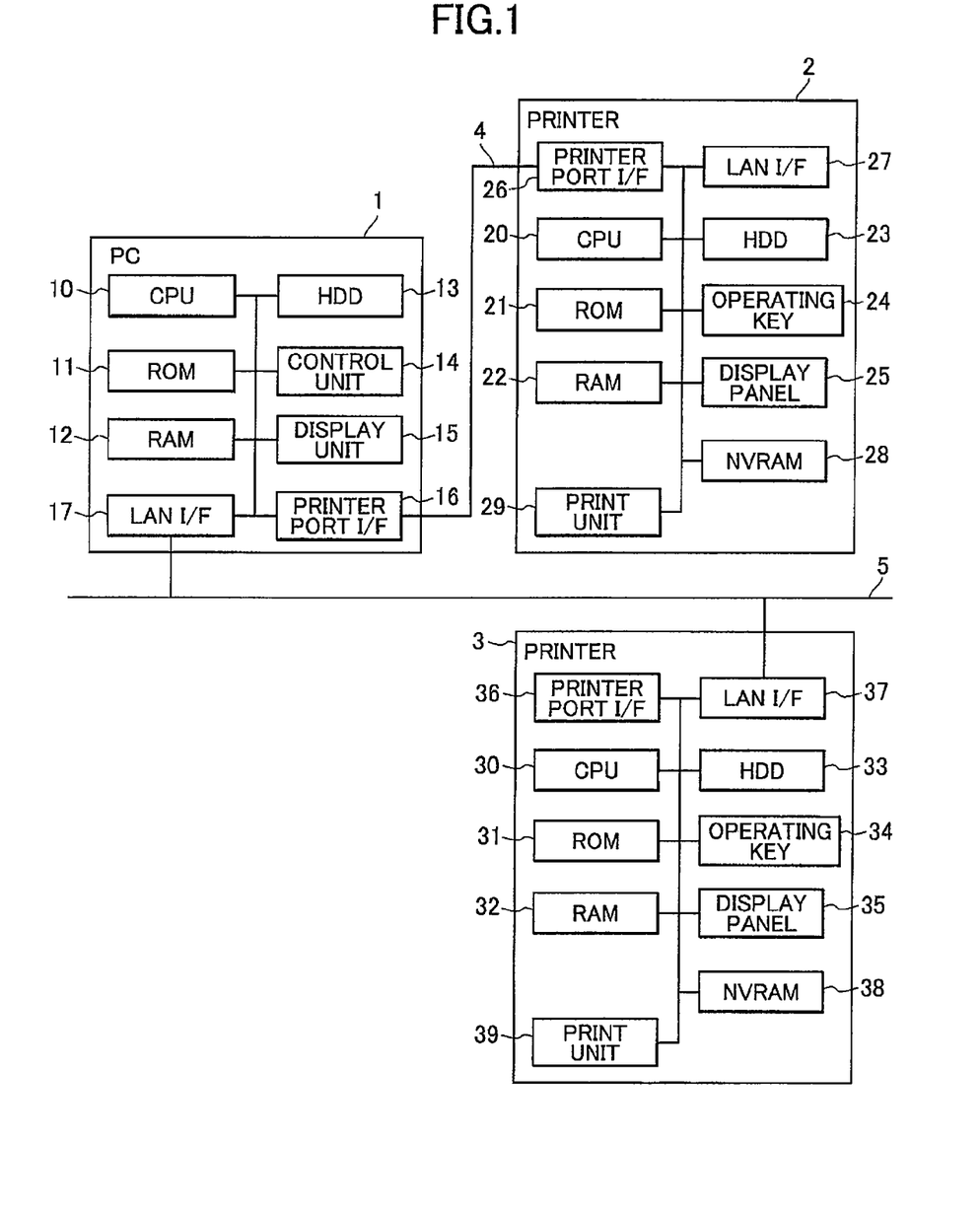
FIG. 1 is a block diagram showing the hardware structure of system including a personal computer for executing a virtual device renaming program according to a preferred embodiment of the present invention, and printers.

FIG. 1 is a block diagram showing the general structure of a system including a personal computer 1. The personal computer 1 functions as a data processing device for executing processes corresponding to the virtual device renaming program according to the preferred embodiment.

The personal computer 1 can communicate with a plurality of printers. FIG. 1 shows two printers 2 and 3 that are connected to the personal computer 1 in different ways. Specifically, the printer 2 is directly connected to the personal computer 1 through a printer cable 4 as a local printer, while the printer 3 communicates with the personal computer 1 through a LAN cable 5 as a network printer.

The personal computer 1 can also communicate with printers other than the printers 2 and 3. However, such printers are not shown in FIG. 1 since the connection configurations are identical to those used for the printers 2 and 3. In a process for renaming virtual device described later, the personal computer 1 will be capable of using five printers, with five virtual devices corresponding to five printers registered in the personal computer 1.

As shown in FIG. 1, the personal computer 1 in the system described above includes a CPU 10, a ROM 11, a RAM 12, a hard disk drive 13, a control unit 14, a display unit 15, a printer port interface 16, and a LAN (local area network) interface 17.

The CPU 10 executes various calculations and processes for controlling components in the personal computer 1 according to programs stored in the ROM 11 and RAM 12. The CPU 10 also executes a process for renaming virtual device described later.

The ROM 11 is a storage device capable of saving stored contents when a power switch of the personal computer 1 is turned off. The ROM 11 stores BIOS (Basic Input/Output System) data and other read-only data that is normally not updated.

The RAM 12 is a storage device employed as a main memory or the like directly accessed by the CPU 10. Operating system, applications programs, and the like are read into the RAM 12 from the hard disk drive 13. The RAM 12 also stores results of computations performed by the CPU 10 and data read from the hard disk drive 13. When executing the process to rename virtual device described later, the CPU 10 reads a virtual device renaming program into the RAM 12 from the hard disk drive 13 and executes the process for renaming virtual device based on the virtual device renaming program stored in the RAM 12.

The hard disk drive 13 functions to save the operating system, various application programs, and various data files, as well as the virtual device renaming program mentioned above.

The control unit 14 is an input device for inputting various user instructions. For example, the control unit 14 is configured of a keyboard and various pointing devices, such as a mouse.

The display unit 15 is an output device for presenting various data to the user. For example, the display unit 15 may be configured of a liquid crystal display capable of displaying color images.

The printer port interface 16 is an interface capable of connecting with a printer. For example, the printer port interface 16 may be configured of a serial interface such as a USB (Universal Serial Bus) interface, or a parallel interface such as an IEEE 1284 interface.

The LAN interface 17 is an interface for communicating with printers or other peripheral devices on a network via a LAN cable.

In the preferred embodiment, Windows (registered trademark) is installed on the personal computer 1 as the operating system. Since the various functions of the Windows operating system are well known in the art, a detailed description of these functions will not be described herein. However, the following description presupposes that the personal computer 1 possesses the various functions provided by Windows.

The printer 2 includes a CPU 20, a ROM 21, a RAM 22, a hard disk drive 23, operating keys 24, a display panel 25, a printer port interface 26, a LAN interface 27, a nonvolatile RAM 28, and a print unit 29.

The CPU 20 executes various calculations and control processes for controlling components in the printer 2 according to control programs stored in the ROM 21.

The ROM 21 is a storage device capable of saving stored contents when a power switch of the printer 2 is switched off. In addition to the control programs mentioned above, the ROM 21 stores various read-only data that is normally not updated.

The RAM 22 is a storage device employed as the main memory or the like directly accessed by the CPU 20. Various data generated through computations by the CPU 20 are temporarily stored in the RAM 22.

The hard disk drive 23 is a storage device for storing a large volume of data that cannot be stored in the RAM 22.

The operating keys 24 are input devices that the user operates manually to issue instructions to the printer 2.

The display panel 25 is configured of a small liquid crystal display that can display settings and status of the printer 2 and other data.

The printer port interface 26 is capable of connecting with a personal computer and has the same standard as the printer port interface 16 of the personal computer 1. For example, the printer port interface 26 may be configured of a serial interface such as the USB interface, or a parallel interface such as the IEEE 1284 interface.

The LAN interface 27 is an interface for communicating with a personal computer on a network via a LAN cable.

The nonvolatile RAM 28 is a storage device for storing variable settings related to the printer 2 and other data that is preferably not lost when the power to the printer 2 is switched off.

The print unit 29 is configured of a conveying mechanism for conveying a sheet-like medium such as a recording paper from a feeding section to a discharging section, a recording mechanism for recording images on the medium while the conveying mechanism conveys the medium along a conveying path, and the like.

The printer 3 includes a CPU 30, a ROM 31, a RAM 32, a hard disk drive 33, operating keys 34, a display panel 35, a printer port interface 36, a LAN interface 37, a nonvolatile RAM 38, and a print unit 39. The components constituting the printer 3 are identical to those in the printer 2 and, hence, a description of these components will not be repeated.

[Process for Renaming Virtual Devices]

Figure 2:
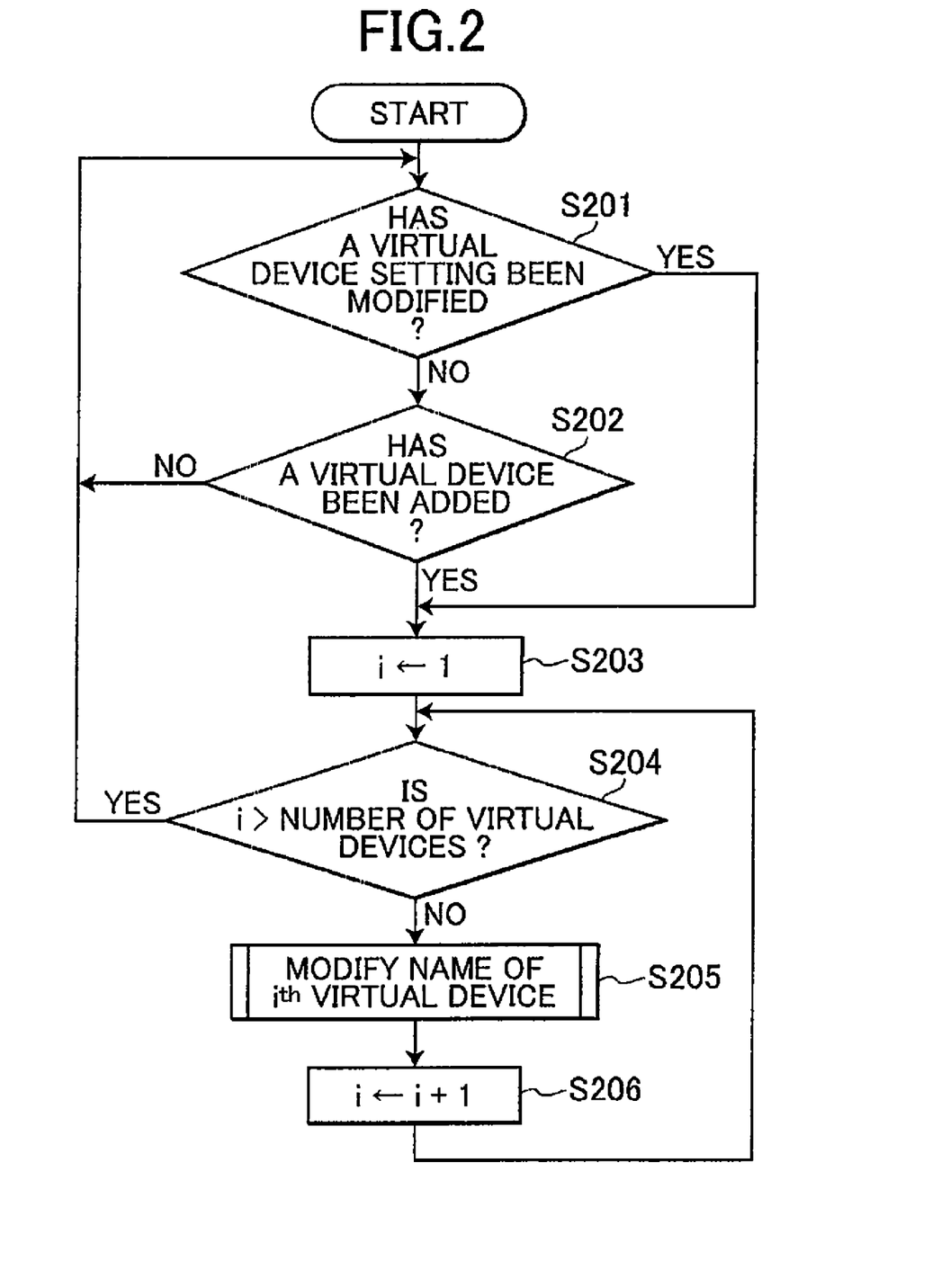
FIG. 2 is a flowchart illustrating steps in the virtual device renaming program according to the preferred embodiment of the present invention.

Next, the process for renaming virtual device executed by the CPU 10 in the personal computer 1 will be described with reference to the flowchart in FIG. 2. While there is no particular restriction on the timing at which this process is started, the process in the preferred embodiment is configured as a resident process that begins executing when the personal computer 1 is started.

Figure 3:
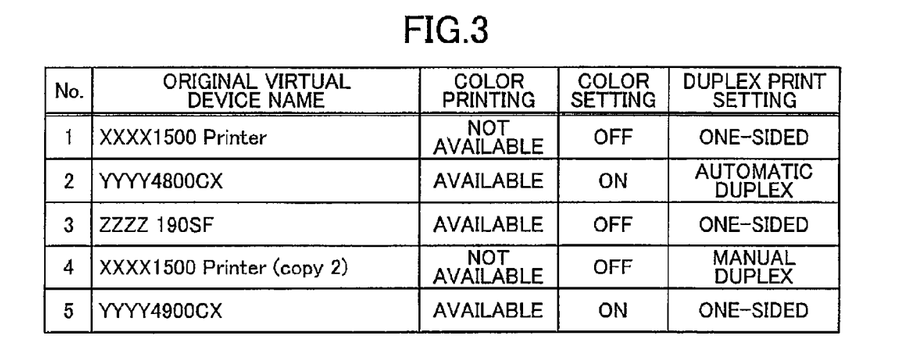
FIG. 3 is a table listing the names of virtual devices and their corresponding functions and setting contents according to the preferred embodiment of the present invention.

The following description addresses a case in which five virtual devices shown in FIG. 3 have been installed in the personal computer 1. That is, the personal computer 1 is capable of using five printers. When each printer driver is installed on the personal computer 1, the name of the printer driver, the name of a file storing the printer driver program, and the like are registered in a registry (storage area managed by the operating system) of the personal computer 1. This process is equivalent to installing a virtual device on the personal computer 1. Thereafter, when an application program outputs print data, the user can specify a virtual device registered in the personal computer 1 as the output destination in order to output the print data to the printer corresponding to that virtual device. In selecting a virtual device as the output destination, the user views names of the virtual devices and selects a desired device. Here, the names of the virtual devices viewed by the user are the names of printer drivers registered in the registry.

Further, in the following description, the five virtual devices will have the settings shown in FIG. 3. In the three types of setting categories shown in FIG. 3, "color printing" indicates whether the printer corresponding to the virtual device possesses a color printing function. This setting category cannot be modified. The "color setting" determines whether the color printing function is available when the printer possesses the color printing function. The user can modify this setting as desired as long as the printer possesses the color printing function. The "duplex print setting" specifies whether to use one-sided printing, automatic duplex printing, or manual duplex printing when the printer possesses a duplex printing function. The user can modify this setting as desired as long as the printer possesses the duplex printing function. Hence, the "color setting" and "duplex print setting" are the only categories that can be modified.

In S201 at the beginning of the process for renaming virtual device, the CPU 10 confirms whether the setting of a virtual device has been modified. If the CPU 10 determines that the setting of a virtual device has been modified (S201: YES), then the CPU 10 advances to S203 described later. If not (S201: NO), then in S202 the CPU 10 determines whether a virtual device has been added. The CPU 10 determines in S202 that a virtual device has been added when a virtual device has been newly installed in the personal computer 1.

If the CPU 10 determines that a virtual device has been added (S202: YES), then the CPU 10 advances to S203. If not (S202: NO), then the CPU 10 returns to S201.

Hence, by looping between the processes in S201 and S202, the CPU 10 monitors whether the setting of a virtual device has been modified and whether a virtual device has been added. The CPU 10 advances to S203 when the setting of a virtual device has been modified (S201: YES) or when a virtual device has been added (S202: YES).

Upon advancing to S203, the CPU 10 initializes a counter i to 1. In S204 the CPU 10 determines whether the counter i is greater than the number of virtual devices. Since there are five virtual devices in the example of the preferred embodiment, in the process of S204 the CPU 10 compares the value stored in the counter i to 5. At this point of the description, the counter i has just been initialized in the process of S203 and, therefore, is not greater than 5 (S204: NO). In this case, the CPU 10 advances to S205.

In S205 the CPU 10 modifies the name of the $i^{th}$ virtual device shown in FIG. 3 based on the value stored in the counter i. Through the process in S205, the virtual device name is modified based on the settings for the virtual device. The renaming process of S205 will be described later in greater detail. For this example, the virtual device names are modified to the names shown in FIG. 4 through the process of S205.

The CPU 10 advances to S206 after completing the process in S205, or by skipping the processes in S204 and S205 when the status of the $i^{th}$ virtual device has not changed (S203: NO). In S206 the CPU 10 increments the counter i by 1 and subsequently returns to S204 after completing the process in S205. By looping back in this way, the processes in S204-S206 are repeated for each of the virtual devices. Upon returning to S204 after repeating the processes of S204-S206 for the number of virtual devices, the counter i is now greater than the number of virtual devices (S204: YES), indicating that the process has been completed for all virtual devices. Accordingly, the CPU 10 returns to S201.

Thereafter, the CPU 10 again loops through the processes of S201 and S202 in order to monitor changes in the settings of the virtual devices and addition of a virtual device. The CPU 10 executes the processes of S203-S206 each time the setting of a virtual device is modified or a virtual device is added.

Figure 4:
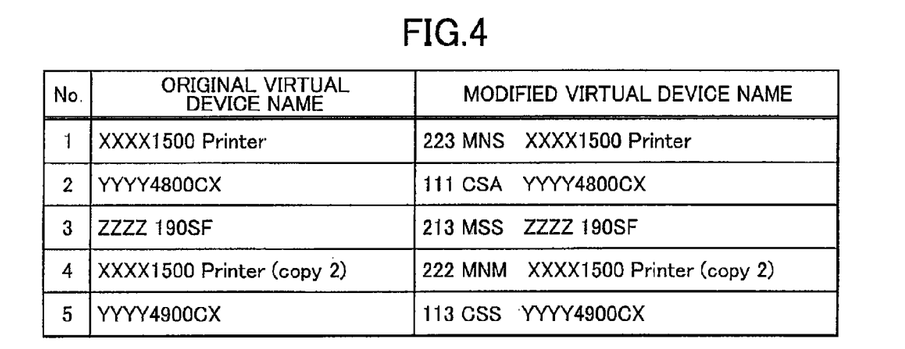
FIG. 4 is a table listing the original virtual device names and modified virtual device names according to the preferred embodiment of the present invention.

By performing the process for renaming virtual device described above, the CPU 10 renames the virtual devices registered in the personal computer 1 as shown in FIG. 4. For example, the original device name "XXXX1500Printer" for virtual device No. 1 is modified the device name "223 MNS XXXX1500Printer." Hence, the character string "223 MNS" is added to the head of the original virtual device name. The added character string has the format "priority string+function symbol string." In the above example of "223 MNS XXXX1500Printer," "223" is the priority string and "MNS" is the function symbol string. The priority string and function symbol string will be described later in detail. After modifying the virtual device name in this way, the "modified virtual device name" shown in FIG. 4 will be displayed when prompting the user to select a virtual device.

Figure 5:
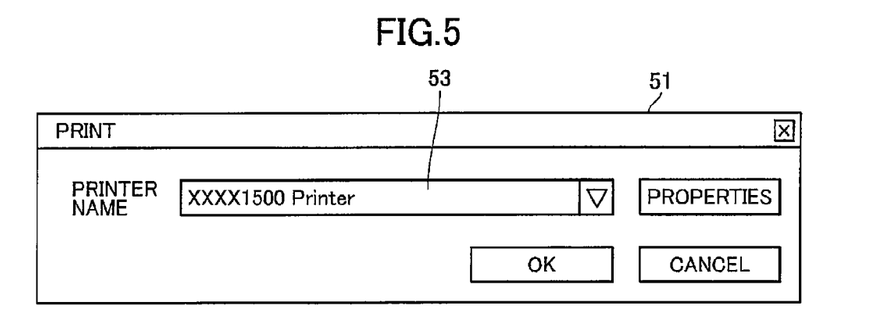
FIG. 5 is an explanatory diagram showing a Print dialog box according to the preferred embodiment of the present invention.

More specifically, when the user performs a prescribed operation in order to use the printer function of an application program, for example, a Print dialog box 51, such as that shown in FIG. 5, is displayed on the display unit 15 of the personal computer 1. A list box 53 is provided in the Print dialog box 51 for allowing the user to select a desired virtual device. When the Print dialog box 51 is first displayed, the currently selected virtual device name is displayed in the list box 53.

Figure 6:
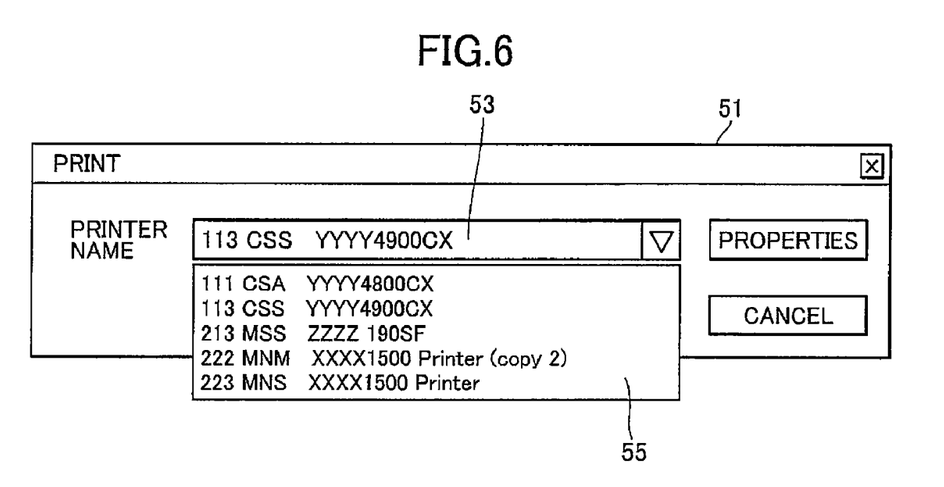
FIG. 6 is an explanatory diagram showing the Print dialog box when a list box has been opened therein according to the preferred embodiment of the present invention.

If the user wishes to select a different virtual device, the user operates a pointing device to click on the mark on the right end of the list box 53 (or performs keyboard operations or the like set as an equivalent function). This operation displays a list 55 near the list box 53 (directly below the list box 53 in the present example), as shown in FIG. 6.

The list 55 includes a list of names for a plurality of alternative virtual devices. Here, the virtual device names are ordered by character code according to the specifications of the Windows OS. As shown in FIG. 4, the virtual device names have been modified by adding the priority string and the function symbol string shown in FIG. 4 to the head of the original virtual device name. Accordingly, the virtual device names to which a priority string of a smaller value has been attached are positioned higher in the list 55 shown in FIG. 6.

[Detailed Description of the Renaming Process]

Figure 7:
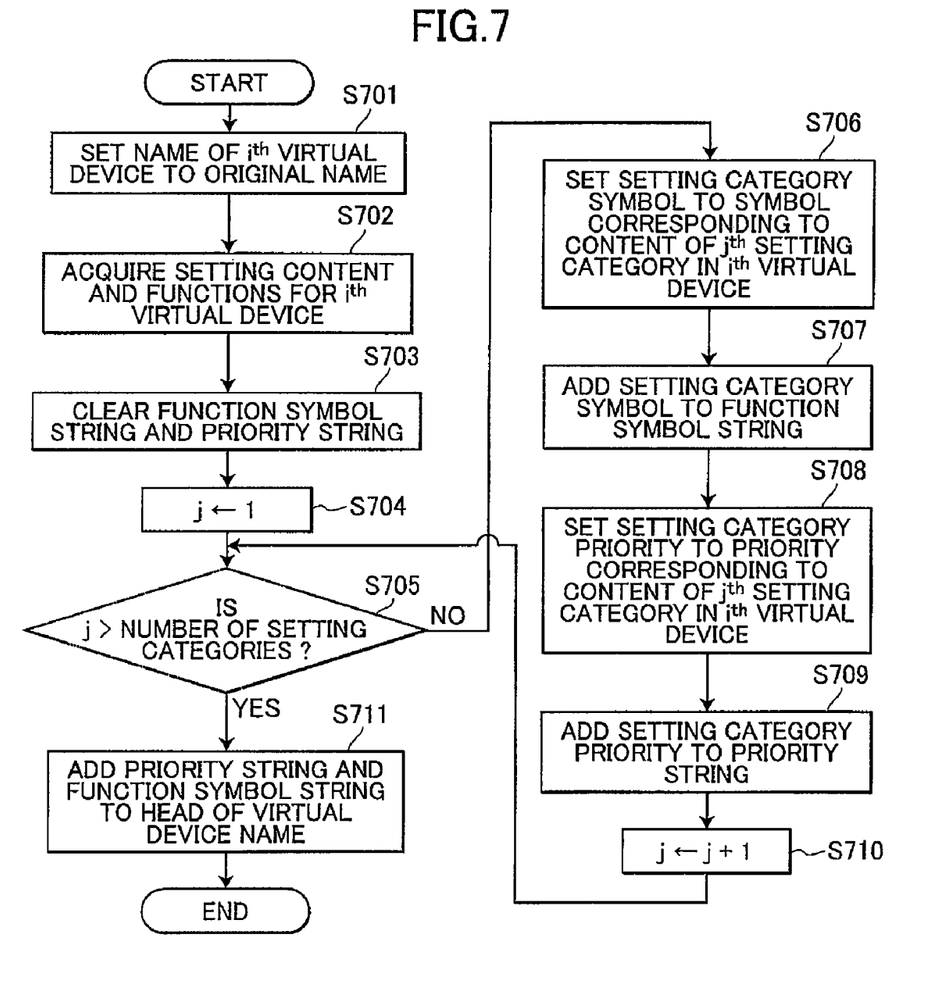
FIG. 7 is a flowchart illustrating steps in a renaming process according to the preferred embodiment of the present invention.

Next, the renaming process of S205 will be described with reference to the flowchart in FIG. 7. The renaming process is a part of the loop process of S204-S206 in the process for renaming virtual devices described above with reference to FIG. 2. Therefore, while the value of the counter i does not change during the renaming process described below, the value of the counter i is modified in S206 described above. Hence, the virtual device targeted for this process is one of the five virtual devices shown in FIG. 3 depending on the value of the counter i. Therefore, in the following detailed description of the renaming process, examples for the value of the counter i will be given as needed.

The renaming process described below serves to add a priority string and a function symbol string to the head of the "original virtual device name" described above. Before describing the renaming process, a description of the priority string and the function symbol string will be given here.

The function symbol string is a character string indicating functions possessed by the virtual device and the current setting of variable setting categories. Specifically, each character of the character string in the function symbol string indicates a function possessed by the virtual device and the current setting of variable setting categories. In the example of the "modified virtual device name" shown in FIG. 4, three symbols are arranged to express the setting of three types of setting categories shown in FIG. 8. As a specific example, the virtual device No. 1 shown in FIG. 4 has the function symbol string "MNS" included in the modified virtual device name. This function symbol string indicates that the content of the color setting is "monochrome printing (M)," the content of the color print function is "not available (N)," and the content of the duplex print setting is "one-sided print (S)."

Figure 9:
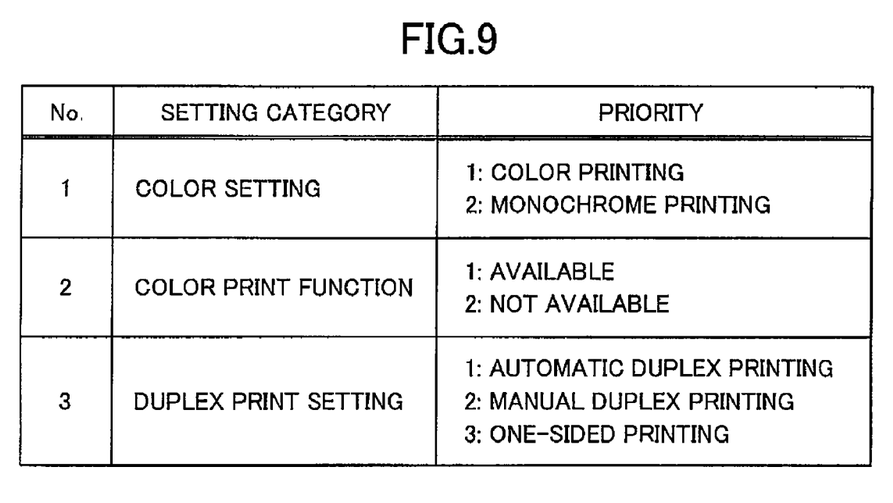
FIG. 9 is a table listing priorities for the various setting categories according to the preferred embodiment of the present invention.

On the other hand, the priority string is a character string added for controlling a display order so that the virtual device names are displayed according to an order of their character codes, as in the list 55 shown in FIG. 6. In the preferred embodiment, the priority string is configured of numbers. Specifically, each digit of the priority string is associated with the same setting category as each character in the function symbol string. Using the example of the "modified virtual device names" in FIG. 4, the priorities of the setting for the three types of setting categories shown in FIG. 9 are represented by the numbers in the priority column of FIG. 9 taken from the three-digit priority string. More specifically, since virtual device No. 1 shown in FIG. 4 has the modified virtual device name including the priority string "223", this represents a priority of 2 for the "monochrome printing" content of the "color setting," a priority of 2 for the "not available" content of the "color print function," and a priority of 3 for the "one-sided printing" content of the "duplex print setting."

The function symbol string and priority string configured above have a one-to-one relationship whereby one string determines the other string. For example, if the function symbol string is set to "MNS", as in virtual device No. 1 shown in FIG. 4, the priority string of "223" is determined by its relationship to the function symbol string. Consequently, the function symbol string and the priority string always have the same number of digits.

Figure 8:
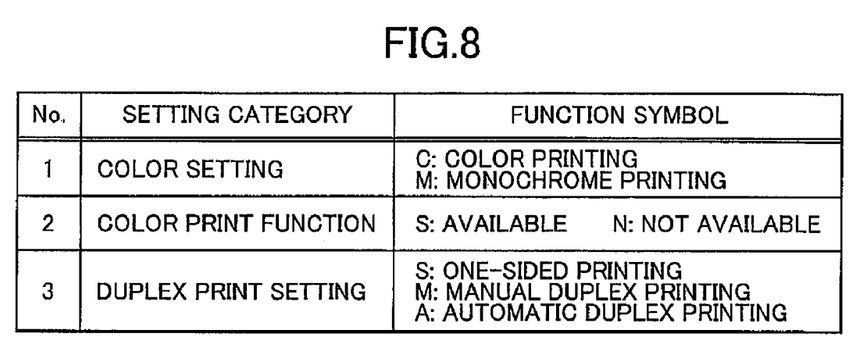
FIG. 8 is a table listing functional symbols for various setting categories according to the preferred embodiment of the present invention.
Figure 10:
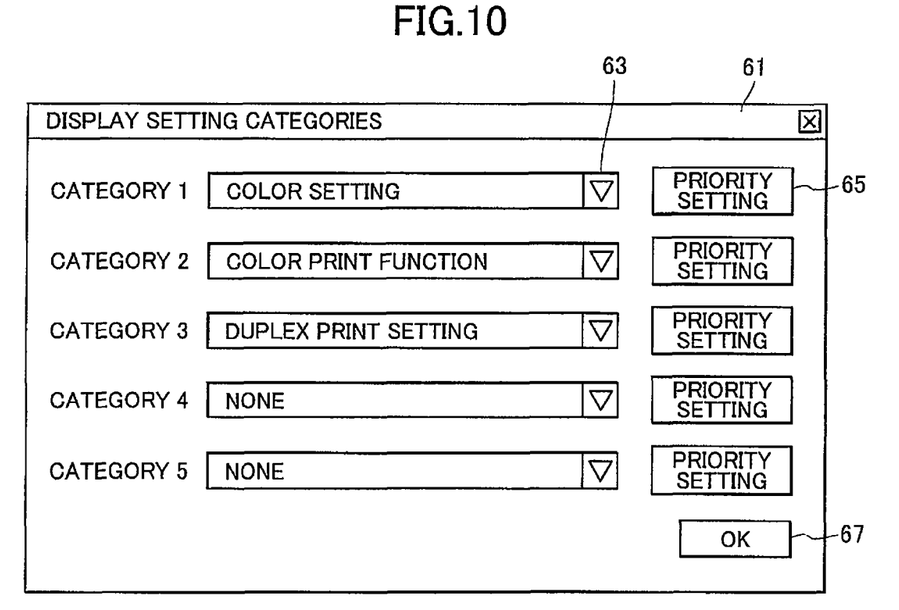
FIG. 10 is an explanatory diagram showing a display settings dialog box according to the preferred embodiment of the present invention.

However, while three digits are used in the examples shown in FIGS. 4, 8, and 9, the number of digits in the function symbol string and the priority string are modified according to the number of setting categories that the user desires and the number of digits required for these settings. More specifically, only three setting categories are shown in FIGS. 8 and 9 for convenience, but numerous other setting categories are available for configuring the function symbol string and priority string. The user can select any number of setting categories (within the range of 1-5 in the preferred embodiment as shown in FIG. 10) from the numerous available setting categories. Further, depending on the setting categories selected by the user, there are cases in which the user can select from among less than 10 selections, from among 10-99 selections, or from among 100 or more selections. Accordingly, the number of digits in the function symbol string and priority string required for these selections may be one, two, or more. In other words, the number of digits occupied by a single setting category in the function symbol string and priority string is not limited to one. Therefore, the number of digits in the function symbol string or priority string is determined according to the number of setting categories selected by the user and the number of digits occupied by each setting category. For example, if there are less than 10 selections in each setting category, only one digit is required in the function symbol string and priority string when the user selects one setting category, and five digits required in the strings when the user selects five categories. Further, if the user selects five setting categories, the function symbol string and priority string must be five digits when there are less than 10 selections in each setting category, as described above, but must be six digits when the number of selections for one of the setting categories falls within the range 10-99.

Further, while the digits in the function symbol string and the priority string in the examples of FIGS. 4, 8, and 9 are ordered from the leading digit to correspond to the settings "color setting," "color print function," and "duplex print setting," this order can be modified. This order is reflected in the order of the virtual device names that are sorted and displayed according to character code, as in the list 55 shown in FIG. 6. Accordingly, the virtual devices can be ordered so that setting categories more important to the user are on the top side. For example, if the user frequently selects virtual devices emphasizing the "color setting" content, the order shown in the examples of FIGS. 8 and 9 can be used as is. However, if the user frequently selects virtual devices emphasizing the "duplex print setting" content, then the order may be changed to "duplex print setting," "color setting," and "color print function," for example.

Further, the "color setting" in the priority string shown in FIG. 9 is configured so that 1 is color printing and 2 is monochrome printing, where the smaller number has a higher priority. Hence, this priority setting gives higher priority to color printing than monochrome printing, but the user may modify the priority setting as desired. Since this priority setting is reflected in the order that the virtual device names are sorted and displayed according to character code, as in the list 55 shown in FIG. 6, the user can set priorities such that setting content having greater emphasis is given smaller numbers. For example, if the user frequently selects virtual devices emphasizing the "color printing" content for the "color setting," then the order may be left as shown in the example of FIG. 9. However, if the user frequently selects virtual devices emphasizing the "monochrome printing" content, then the user may modify the priorities such that 1 is monochrome printing and 2 is color printing.

Figure 11:
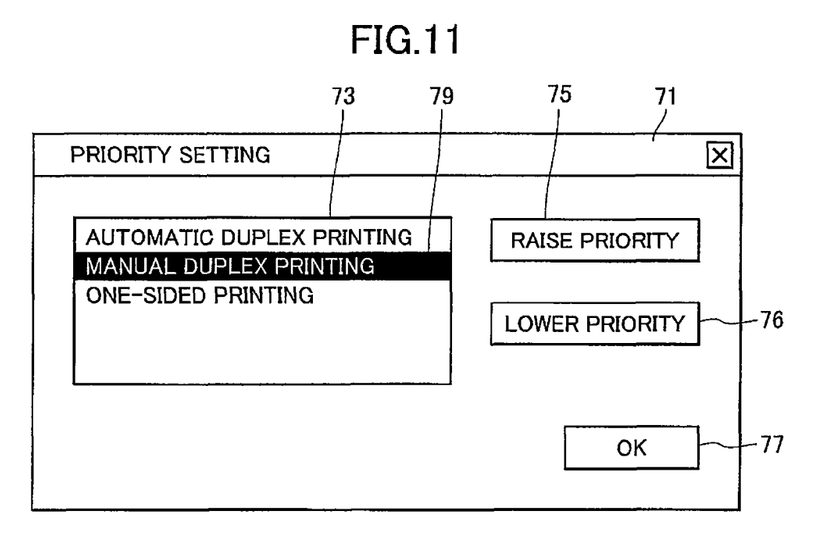
FIG. 11 is an explanatory diagram showing a priority settings dialog box according to the preferred embodiment of the present invention.

Settings in the function symbol string and priority string can be modified as described above with a user interface such as that shown in FIGS. 10 and 11. FIG. 10 shows a display settings dialog box 61 displayed on the display unit 15 of the personal computer 1 when the user issues a command in an application running on the personal computer 1 to modify variable setting categories for the function symbol string and priority string. The display settings dialog box 61 is provided with five list boxes 63 corresponding to the maximum of five setting categories that the user can select; priority setting buttons 65 provided next to each of the list boxes 63, and an OK button 67.

Each list box 63 is an entry field in which the user can select target setting categories (functions) to specify their order. If the user wishes to select a different setting category in the list box 63, the user clicks on a mark in the right end of the list box 63 using a pointing device, through which operation a list (not shown) is displayed near the list box 63, and can select a desired setting category from the list. In the example shown in FIG. 10, "color setting," "color print function," and "duplex print setting" have been selected in the list boxes 63 for categories 1, 2, and 3. The list boxes 63 for categories 4 and 5 have been set to "none." When the user clicks on the OK button 67 after making these selections, each digit in the function symbol string and the priority string in order from the leftmost digit is associated with each of the setting categories in the order "color setting," "color print function," and "duplex print setting," forming a total of three digits for each of the function symbol string and the priority string.

Further, by clicking on one of the priority setting buttons 65 associated with each of the list boxes 63 using the pointing device, the user can display a priority settings dialog box 71 shown in FIG. 11 on the display unit 15 of the personal computer 1. The priority settings dialog box 71 shown in FIG. 11 is an example of a dialog box displayed when the user clicks on the priority setting button 65 corresponding to category 3 in the display settings dialog box 61 of FIG. 10, when the "duplex print setting" has been selected for category 3.

The priority settings dialog box 71 includes a list box 73 displaying the selections that are a target of the priority setting (in the example of FIG. 11, the three selections "automatic duplex printing," "manual duplex printing," and "one-sided printing"), a Raise Priority button 75, a Lower Priority button 76, and an OK button 77. The selections are listed in the order of priority in the list box 73 with the selection of highest priority on the top.

If the user wishes to change the priority of selections, the user can place a focus 79 over a single selection by clicking on one of the selections displayed in the list box 73. By subsequently clicking on the Raise Priority button 75 or the Lower Priority button 76, the user can move the selection with which the focus 79 is aligned (the "manual duplex printing" selection in the example of FIG. 11) up or down. After changing the order of selections in the list box 73 to the desired order of priority, the user clicks on the OK button 77 to set the modified priority.

As a more concrete example using the case shown in FIG. 11, the selections "automatic duplex printing," "manual duplex printing," and "one-sided printing" are displayed in the list box 73 in order of priority, the selection of highest priority being at the top. If the user clicks on the OK button 77 at this time, the settings 1: automatic duplex printing, 2: manual duplex printing, and 3: one-sided printing are set, as shown in the priority field of FIG. 9. However, if the user modifies the order of selections displayed in the list box 73, then the values in the priority field of FIG. 9 are modified. For example, if the user modifies the order to "manual duplex printing," "automatic duplex printing," and "one-sided printing" by raising the priority of the "manual duplex printing" in the list box 73 and clicks on the OK button 77, then the values in the priority field FIG. 9 are modified to 1: manual duplex printing, 2: automatic duplex printing, and 3: one-sided printing.

The setting content of all variable setting categories related to the function symbol string and priority string modified as described above is saved in a file and used as reference during the renaming process described below. As described above, the user can modify the variable setting categories for the function symbol string and priority string as desired. However the following detailed description of the renaming process assumes that the settings are those shown in the example of FIGS. 8 and 9.

In S701 at the beginning of the renaming process, the CPU 10 targets the $i^{th}$ virtual device in FIG. 3 based on the value of the counter i and initializes the name of this virtual device to the original virtual device name. For example, when the value stored in the counter i is 5, the initialized virtual device name becomes "YYYY4900CX."

In S702 the CPU 10 acquires the setting content and functions for the $i^{th}$ virtual device. In the preferred embodiment, the setting values and functions are acquired from a storage area allocated in the registry of the personal computer 1 when the virtual device was installed. However, depending on need, the CPU 10 may communicate with the printer corresponding to the virtual device to acquire some of the data from the printer side or may read the data from a settings file other than the registry. In the present embodiment, the CPU 10 acquires data such as that shown in FIG. 3 through the process of S702.

In S703 the CPU 10 clears the function symbol string and the priority string. More specifically, the process of S703 serves to clear a buffer for generating the function symbol string and the priority string. The CPU 10 subsequently sets a counter j to 1 in S704 and determines in S705 whether the value stored in the counter j is greater than a number of display setting categories. The display setting categories in S705 are selected by the user in the display settings dialog box 61 shown in FIG. 10 as the setting categories that the user wishes to display. In the present example, there are three display setting categories. Hence, in the present example, the CPU 10 compares the value stored in the counter j to 3 in S705. Since the counter j holds the value 1 immediately after the CPU 10 has executed the process in S704 (S705: NO), the CPU 10 advances to S706.

In S706 the CPU 10 sets a setting category symbol to the function symbol corresponding to the content of the $j^{th}$ display setting category set for the $i^{th}$ virtual device. For example, when the counter j holds the value 1 in the present example, the CPU 10 determines the content of the "color setting" for the $i^{th}$ virtual device, since the first display setting category is the "color setting" (see FIGS. 8-10), by referring to the setting content acquired in S702. If the value stored in the counter i is 2 at this time, the second virtual device shown in FIG. 3 has the value "ON" (color printing) for the "color setting" acquired in S702. Therefore, the function symbol corresponding to the "color setting" set as the first display setting category is "C: color printing" shown in FIG. 8. Accordingly, the setting category symbol is set to "C". After determining the setting category symbol, in S707 the CPU 10 adds the setting category symbol to the function symbol string.

In S708 the CPU 10 sets a setting category priority to the priority corresponding to the content of the $j^{th}$ display setting category set for the $i^{th}$ virtual device. For example, when the value stored in the counter j is 1 in the present example, the "color setting" in the first display setting category is set to the content "ON" (color printing) as described above. Since the priority associated with "ON" (color printing) shown in FIG. 9 is "1: color printing," the setting category priority is set to "1". After determining the setting category priority, in S709 the CPU 10 adds this priority to the priority string.

After incrementing the counter j by 1 in S710, the CPU 10 returns to S705. As long as the CPU 10 reaches a negative determination in S705 (S705: NO), the CPU 10 loops through the processes S705-S710. As the CPU 10 loops repeatedly in this way, the value of the counter j is incremented by 1 each time so that the display setting categories Nos. 1-3 are processed sequentially for the $i^{th}$ virtual device. For example, when the value of the counter i is 5, the function symbol string undergoes the changes C→CS→CSS, resulting in the function symbol string for virtual device No. 5 being ultimately set to CSS. Further, when the value of the counter i is 5, the priority string undergoes the changes 1→11→113, resulting in the priority string for virtual device No. 5 being set ultimately to 113.

When the counter j becomes greater than the number of setting categories (S705: YES), then in S711 the CPU 10 adds the priority string and the function symbol string to the head of the virtual device name for the $i^{th}$ virtual device, and subsequently ends the renaming process. For example, in S711 the CPU 10 changes the virtual device name of virtual device No. 5 to "113 CSS YYYY4900CX" by adding the priority string "113" and the function symbol string "CSS" to the head of the original device name "YYYY4900CX."

When the Print dialog box 51 shown in FIG. 6 is displayed after modifying the virtual device names in the process described above, the modified virtual device names are sorted in the list 55 in order of character code according to the specifications of the Windows (registered trademark) operating system. Hence, the modified virtual device names are sorted based on the priority strings added to the head of the virtual device name.

In the example shown in FIG. 6, the virtual device names are broadly sorted and displayed in the list 55 so that modified device names having priority strings with a 1 as the first digit are displayed at the top, while modified device names having priority strings with a 2 as the first digit are displayed at the bottom. In other words, virtual devices having "1: color printing" as the content of the "color setting" are displayed at the top, while virtual devices having the "2: monochrome printing" as the content of the "color setting" are displayed at the bottom. By referencing the leading character in the function symbol string, the user can confirm that devices set to "C: color printing" are on the top, while devices having the setting "M: monochrome printing" are at the bottom. However, if the user were to change the priorities for content of the "color setting" in the priority settings dialog box 71 shown in FIG. 11 to the priorities "1: monochrome printing," and "2: color printing," then virtual devices having a priority string with the leading digit 1 are displayed in the top of the list 55 as described above. However, this time the "color setting" of the virtual devices displayed in the top is "1: monochrome printing." Therefore, by referencing the leading character in the function symbol string, the user can confirm that devices having the setting "M: monochrome printing" are displayed in the top.

Further, while the modified virtual devices with the "color setting" of "1: color printing" in FIG. 6 (the top two entries in the list 55) also have a 1 as the second digit in the priority string, the modified virtual device name with a 1 as the third digit in the priority string is displayed above the modified virtual device name having a 3 as the third digit of the priority string. This indicates that devices having "A: automatic duplex printing" as the "duplex print setting" are displayed above device having "S: one-sided printing" as the "duplex print setting."

Further, in the virtual devices in FIG. 6 having the "2: monochrome printing" content for the "color setting" (the bottom three entries in the list 55), modified virtual device names including a 1 in the second digit of the priority string are displayed on the top, while those having a 2 as the second digit are displayed therebelow. This means that virtual devices having a "S: available" setting for the "color print function" are displayed above those having "N: not available" as the "color print function."

Further, in the virtual devices in FIG. 6 having "2: monochrome printing" as the "color setting" and a 2 as the second digit of the priority string (the bottom two entries in the list 55), the modified virtual device name having a 2 as the third digit in the priority string is displayed above the virtual device name having a 3 as the third digit. This means that virtual devices having the content "M: manual duplex printing" for the "duplex print setting" are displayed above virtual devices having the "S: one-sided printing" as the "duplex print setting."

As a result, the modified virtual device names displayed in the list 55 in FIG. 6 are ordered so that devices already in a state capable of performing color printing are given highest priority and displayed at the top. If there are more than one of these virtual devices, then the virtual devices capable of performing automatic duplex printing are displayed on top. In the virtual devices that are not in a state capable of performing color printing, those devices that can be set to a state capable of color printing are displayed above the others. This control of the display order is achieved by adding the priority strings. However, since the priority strings alone are unclear as to whether a priority setting is giving priority to color printing or monochrome printing, for example, the function symbol string is also added. If the user understands the meaning of the function symbols, the user can acknowledge for which settings the virtual devices have been given priority (displayed highest) by referencing the function symbols.

EFFECTS OF THE INVENTION

As described above, the personal computer 1 executes the virtual device renaming process in order to target 1, 2, or more functions ("color setting," "color print function," and "duplex print setting" in the preferred embodiment described above) including at least a function whose setting can be modified by the user ("color setting" and "duplex print setting" in the preferred embodiment) from among the plurality of functions possessed by the virtual device, and to modify the virtual device name based on the settings of the target functions.

Hence, when a plurality of modified virtual device names are displayed, the user can select a virtual device having a desired setting by referencing the modified virtual device names. Further, since the number of displayed virtual device names is not modified, even though the virtual device names are modified according to the function settings, the user is not faced with the difficulty of having to choose from an enormous number of selections, unlike the conventional technology in which a plurality of functional device names is generated by combining the device names with a plurality of function names.

Further, the personal computer 1 displays the plurality of modified virtual device names in the order of their character codes after adding the priority string and function symbol string, which are character strings indicating settings of the virtual devices, to the head of the virtual device name. Accordingly, the modified virtual device names are ordered in groups of virtual devices having the same settings, thereby facilitating the user in selecting a virtual device having the desired setting.

Further, the user can specify target functions (setting categories) and priorities of a plurality of settings that can be selected within those functions using the display settings dialog box 61 and the priority settings dialog box 71. Since a priority string for controlling the displayed order based on the target functions and a function symbol string representing settings of these functions are added to virtual device names only for the specified functions, the user can more easily select virtual devices having the desired settings than when the character string also includes settings less important to the user. Particularly, since the user can specify an order of target functions and a priority for the display order by setting the selected order of categories 1-5 in the display settings dialog box 61 and the priority settings in the priority settings dialog box 71, modified virtual device names having desired settings of the most important functions are displayed on top, enabling the user to easily select these virtual devices. Further, when the user wishes to select a virtual device having a desired combination of functional settings, the user can select a single group based on the most important function, and subsequently select a single group from among the first selected group based on the next target function. By repeating this operation the user can easily find the desired virtual device.

Further, since the personal computer 1 modifies the virtual device name in S202 when a new virtual device has been installed, the device name of the new virtual device is immediately modified, enabling the user to select a virtual device having the desired settings by viewing virtual device names of all devices including the new virtual device.

Further, since the personal computer 1 modifies the virtual device name in S201 when the setting for at least one virtual device has changed, the virtual device names can be modified to reflect the latest settings.

While the invention has been described in detail with reference to specific embodiments thereof, it would be apparent to those skilled in the art that many modifications and variations may be made therein without departing from the spirit of the invention, the scope of which is defined by the attached claims.

For example, in the preferred embodiment described above, both the priority string and the function symbol string are added to the original virtual device name in order to control the display order for the virtual device names and to display the functions and settings possessed by the virtual devices. However, it is also possible to add only the function symbol string if it is not necessary to control the display order of the virtual device names by adding the priority string.

In this case, the modified virtual device names are displayed in order of their character codes. While the virtual device names may not always be displayed in an order desired by the user, virtual devices having the same settings for the same function symbol string are grouped together. Therefore, while the order may not be fixed, the user can select virtual devices having the desired function by referencing the modified virtual device names, provided that the function symbol string is included in the names.

Further, in the preferred embodiment described above, the user can arbitrarily switch the setting categories assigned to the digits in the priority string and the function symbol string in the display settings dialog box 61 and can arbitrarily set priorities for a plurality of setting contents in each of the setting categories in the priority settings dialog box 71. However, it is possible to eliminate one or more of these options that allow the user to change settings. In such cases, the user can still select a virtual device having the desired function by viewing the modified virtual device names, provided that at least the function symbol string is displayed in the modified virtual device names.

What is claimed is:

1. A data processing device comprising:
   a processor configured to execute instructions that cause the processor to provide functional units including:
      a registering unit that registers a plurality of communicable printers as a plurality of virtual devices, each of the plurality of virtual devices having a plurality of functions;
      a settings-acquiring unit that acquires a setting for at least one of the plurality of functions for each of the plurality of virtual device; and
      a virtual device renaming unit that changes at least one of the virtual device names for the plurality of the virtual devices to a device name representing the setting of a corresponding virtual device acquired by the settings-acquiring unit; and
   a display unit that displays a plurality of virtual device names for the plurality of virtual devices,
   wherein the virtual device renaming unit adds a character string to the virtual device name, the character string representing the setting of the virtual device acquired by the settings-acquiring unit, and
   wherein the virtual device renaming unit adds the character string to a head of the virtual device name to provide a modified virtual device name, and the display unit displays and sorts the modified virtual device name to be arranged in a predetermined order.

2. The data processing device according to claim 1, wherein at least one of settings for each of the plurality of functions is variable.

3. The data processing device according to claim 1, wherein when a new virtual device has been installed, the virtual device renaming unit changes a virtual device name of the virtual device.

4. The data processing device according to claim 1, wherein the virtual device renaming unit changes the virtual device name when a setting changes for at least one of the virtual devices whose settings were acquired by the settings-acquiring unit.

5. A data processing device comprising:
   a processor configured to execute instructions that cause the processor to provide functional units including:

a registering unit that registers a plurality of communicable printers as a plurality of virtual devices, each of the plurality of virtual devices having a plurality of functions;

a settings-acquiring unit that acquires a setting for at least one of the plurality of functions for each of the plurality of virtual device; and a virtual device renaming unit that changes at least one of the virtual device names for the plurality of the virtual devices to a device name representing the setting of a corresponding virtual device acquired by the settings-acquiring unit; and a display unit that displays a plurality of virtual device names for the plurality of virtual devices, wherein the virtual device renaming unit adds a character string to the virtual device name, the character string representing the setting of the virtual device acquired by the settings-acquiring unit, wherein the processor is further configured to provide a function designating unit that enables a user to designate a target function among the plurality of functions, the target function having a setting acquired by the settings-acquiring unit, and wherein the character string represents the setting of the target function designated in the function designating unit.

6. The data processing device according to claim 5, wherein the virtual device renaming unit adds the character string to a head of the virtual device name to provide a modified virtual device name, the character string representing the setting of the target function designated by the function designation unit, wherein the display unit displays and sorts the modified virtual device name to be arranged in the predetermined order.

7. The data processing device according to claim 6, wherein the function designating unit enables the user to designate an order for a plurality of target functions when the user designates the plurality of target functions, and the virtual device renaming unit creates a function symbol string in which a plurality of character strings representing settings of the plurality of target functions is arranged according to the order designated by the function designating unit, and adds the function symbol string to the head of the virtual device name.

8. The data processing device according to claim 6, wherein function designation unit also enables to the user to assign a priority to the setting of the target function when the user designates the target function, and the virtual device renaming unit creates a priority string representing the priority of the setting of the target function and adds the priority string to the head of the virtual device name, the priority string being composed of a character string representing the priority assigned to the setting of the target function, the priority string having a higher priority being displayed on the display unit in a higher position according to the predetermined order when sorting and displaying the virtual device names having the priority string.

9. The data processing device according to claim 5, wherein when a new virtual device has been installed, the virtual device renaming unit changes a virtual device name of the virtual device.

10. The data processing device according to claim 5, wherein the virtual device renaming unit changes the virtual device name when a setting changes for at least one of the virtual devices whose settings were acquired by the settings-acquiring unit.

11. A non-transitory computer readable medium containing a virtual device renaming program for instructing, when executed, a data processing device capable of registering a plurality of communicable printers as a plurality of virtual devices, each of the plurality of virtual devices having a plurality of functions, displaying a plurality of virtual device names for the plurality of virtual devices, prompting a user to select one of the plurality of virtual devices, and transmitting print data to a printer corresponding to a selected virtual device, the virtual device renaming program comprising:

a program for acquiring a setting for at least one of the plurality of functions for each of the plurality of virtual device; and a program for renaming at least one of the virtual device names for the plurality of the virtual devices to a device name representing the setting of a corresponding virtual device acquired in the acquiring program, wherein the renaming program includes an adding program for adding a character string to the virtual device name, the character string representing the setting of the virtual device acquired in the acquiring program, and wherein the adding program adds the character string to a head of the virtual device name to provide a modified virtual device name, the data processing device being configured to display and sort the modified virtual device name to be arranged in a predetermined order.

12. The non-transitory computer readable medium containing the virtual device renaming program according to claim 11, wherein at least one of settings for each of the plurality of functions is variable.

13. The non-transitory computer readable medium containing the virtual device renaming program according to claim 11, wherein the renaming program is executed when a new virtual device has been installed in the data processing device.

14. The non-transitory computer readable medium containing the virtual device renaming program according to claim 11, wherein the renaming program is executed when a setting changes for at least one of the virtual devices whose settings were acquired in the acquiring program.

15. A non-transitory computer readable medium containing a virtual device renaming program for instructing, when executed, a data processing device capable of registering a plurality of communicable printers as a plurality of virtual devices, each of the plurality of virtual devices having a plurality of functions, displaying a plurality of virtual device names for the plurality of virtual devices, prompting a user to select one of the plurality of virtual devices, and transmitting print data to a printer corresponding to a selected virtual device, the virtual device renaming program comprising:

a program for acquiring a setting for at least one of the plurality of functions for each of the plurality of virtual device; and a program for renaming at least one of the virtual device names for the plurality of the virtual devices to a device name representing the setting of a corresponding virtual device acquired in the acquiring program, wherein the renaming program includes an adding program for adding a character string to the virtual device name, the character string representing the setting of the virtual device acquired in the acquiring program, wherein the virtual device renaming program further comprising a function designating program for enabling a user to designate a target function among the plurality of functions, the target function having a setting acquired in the acquiring program, and wherein the character string represents the setting of the target function designated in the function designating program.

16. The non-transitory computer readable medium containing the virtual device renaming program according to claim 15, wherein the adding program adds the character string to a head of the virtual device name to provide a modified virtual device name, the character string representing the setting of the target function designated in the function designating program, the data processing device being configured to display and sort the modified virtual device name to be arranged in the predetermined order.

17. The non-transitory computer readable medium containing the virtual device renaming program according to claim 16, wherein the function designating program includes a program for enabling the user to designate an order for a plurality of target functions when the user designates the plurality of target functions, and the renaming program includes a program for creating a function symbol string in which a plurality of character strings representing settings of the plurality of target functions is arranged according to the order designated in the function designating program, and a program for adding the function symbol string to the head of the virtual device name.

18. The non-transitory computer readable medium containing the virtual device renaming program according to claim 16, wherein the function designating program includes a priority assigning program for enabling to the user to assign a priority to the setting of the target function when the user designates the target function, and the renaming program includes a program for creating a priority string representing the priority of the setting of the target function and a program for adding the priority string to the head of the virtual device name, the priority string being composed of a character string representing the priority assigned to the setting of the target function, the priority string having a higher priority being such that the priority string is displayed in a higher position according to the predetermined order when sorting and displaying the virtual device names having the priority string.

19. The non-transitory computer readable medium containing the virtual device renaming program according to claim 15, wherein the renaming program is executed when a new virtual device has been installed in the data processing device.

20. The non-transitory computer readable medium containing the virtual device renaming program according to claim 15, wherein the renaming program is executed when a setting changes for at least one of the virtual devices whose settings were acquired in the acquiring program.

* * * * *